Jan. 18, 1966  J. ELLIOT, JR., ETAL  3,230,503
TRANSDUCER
Filed June 22, 1962
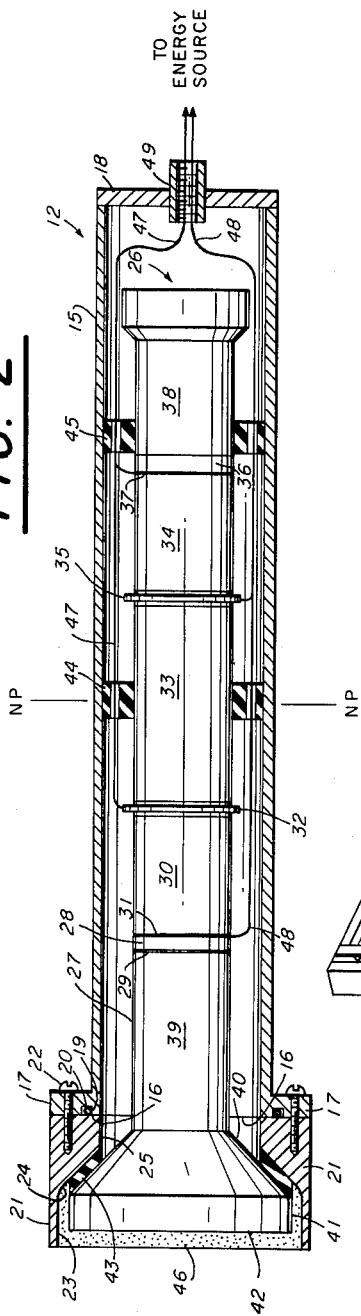
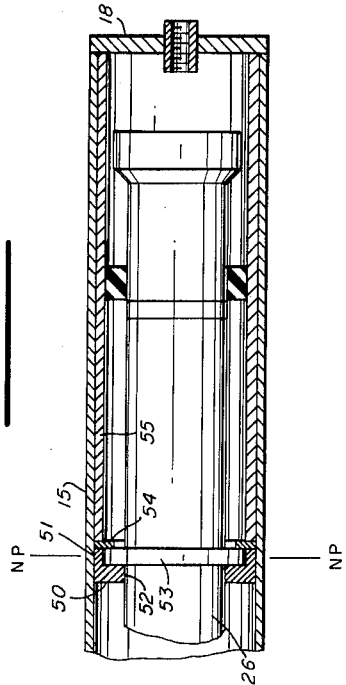
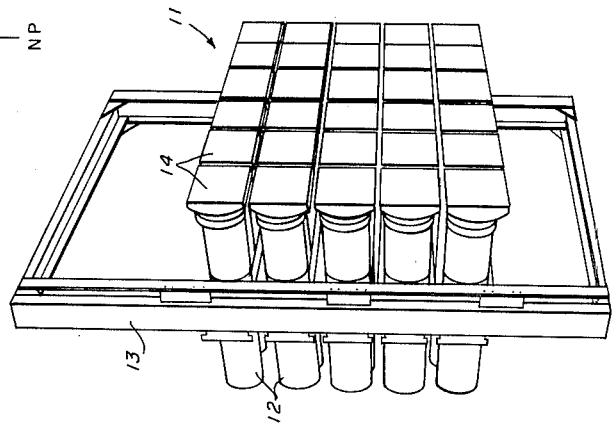
INVENTOR.
JACK (NMI) ELLIOT, JR.
JACK W. HOLLOWAY
BY
ATTORNEYS

United States Patent Office 3,230,503
Patented Jan. 18, 1966

3,230,503
TRANSDUCER
Jack Elliot, Jr., San Diego, and Jack W. Holloway, Chula Vista, Calif., assignors to the United States of America as represented by the Secretary of the Navy
Filed June 22, 1962, Ser. No. 204,649
5 Claims. (Cl. 340—10)
(Granted under Title 35, U.S. Code (1952), sec. 266)

The invention described herein may be manufactured and used by or for the Government of the United States of America for governmental purposes without the payment of any royalties thereon or therefor.

The present invention relates in general to transducers and in particular is an electrostrictive sonar transducer for converting electrical energy into proportional acoustical energy while being subjected to and withstanding severe thermal and vibratory shocks.

In the past, sonar transducers which were operated within the extremely cold environments of the Arctic ordinarily would fracture, break, or become effectively disassembled and operationally useless whenever a rapid transition was made from relatively warm to relatively cold temperatures and vice versa. Such rapid transitions might occur, for example, when going from cold air to relatively warm water when diving from the surface, when going from warm water to relatively cold air when surfacing, or when encountering rapidly varying water temperatures while changing depths or proceeding on the desired navigational course. Accordingly, in many instances, the transducers of the prior art left a great deal to be desired and in some cases became completely ineffective.

A new approach was made to the problem and the resulting subject invention provided a successful solution to it.

The present invention overcomes the objectionable operational and structural features of the prior art, in that it is a transducer that will withstand rapid temperature and pressure variations while efficiently broadcasting acoustical energy underwater.

It is, therefore, an object of this invention to provide an improved electroacoustical transducer.

Another object of this invention is to provide a sonar transducer that will reliably operate while being exposed to rapid temperature and pressure changes.

Still another object of this invention is to provide an improved electroacoustical transducer having a piezoelectric energy conveter that is mechanically, acoustically, and electrically isolated from the housing.

A further objective of this invention is to provide a sonar transducer having an optimum impedance match between the elements of the non-radiating surface thereof.

A further object of this invention is to provide an improved sonar transducer containing a piezoelectric ceramic energy converter that is electrically isolated from both its housing and the ambient environmental medium within which it is operating.

Another object of this invention is to provide an electro-acoustical transducer that will operate within hydrostatic pressures up to one thousand pounds per square inch.

Still another object of this invention is to provide a sonar transducer which prevents thermally induced stress and strains from occurring in the piezoelectric ceramic converter elements sufficiently to prevent the operational and physical destruction thereof.

Another object of this invention is to provide a stronger transducer with reduced susceptibility to bending moments, vibrations, shock, and impact.

Another object of this invention is to provide an array of improved electroactoustical transducers which will efficiently operate at low sonar frequencies and high outputs.

A further objective of this invention is to provide an improved electroacoustical transducer that can be easily and economically manufactured and maintained.

Other objects and many of the attendant advantages of this invention will be readily appreciated as the same becomes better understood by reference to the following detailed description when considered in connection with the accompanying drawings wherein:

FIG. 1 illustrates an exemplary array of the electroacoustical transducers of this invention;

FIG. 2 is an elevational view of an individual embodiment of the transducer of this invention shown partially in pictorial form and partly in section;

FIG. 3 is a partial elevational view of a portion of another exemplary embodiment of the transducer of this invention, depicted partially in pictorial form and partially in section to show in detail the alumina nodal disc and shock mount assembly as the center support member for the energy converter element.

Referring now to the drawing and FIG. 1 in particular, there is shown an array 11 of transducers 12 contiguously mounted on a support structure 13 of any suitable type so that the individual energy projecting faces 14 thereof combine to form a predetermined geometrical configuration. In the illustration of FIG. 1, said faces are depicted as being in a plane, but it should be understood that they also may be so disposed and curved as to form a ring, a sphere, a cube, or any other structural configuration necessary to effect desired radiation propagation patterns, since so doing would obviously be well within the purview of the artisan who has the benefit of the teachings herein presented.

FIG. 2 further illustrates transducer 12 as having a housing 15 which may be of any suitable structural material such as metal, plastic, or the like, and which has an open end 16 with a flange 17 thereat and the opposite end thereof closed by means of an end plate 18 fixedly fastened thereto as by welding or cementing or any other suitable way.

Disposed within said flange at the longitudinal extremity thereof is a groove 19 containing a resilient O-ring 20 of rubber or the like. A cylinder 21 is attached to flange 17 as by screws in such manner that O-ring 20 provides a water-tight seal thereat. While the outer surface of cylinder 21 may be of uniform circular shape, the inner surface contains an enlarged straight uniform circular portion 23, a wedged or funnel shaped portion 24, and another circular portion 25 having an inside diameter substantially equal to the inside diameter of the aforesaid housing.

Disposed within the hollow portion of housing 15 concentrically along the longitudinal axis thereof is a half-wave ceramic sandwich resonating transducing element 26 which contains an aluminum radiating head 27, an alumina ($Al_2O_3$) disc 28 attached thereto by means of an epoxy cement 29. A substantially cylindrically shaped piezo-electric ceramic energy converter 30 has one end thereof attached to alumina disc 28 by means of a fused silver cementing compound which also acts as an electrode 31 to which electrical current is applied, as will be explained in more detail subsequently. A metal screen electrode 32 of copper, silver, or nickel is securely mounted between the other end of energy converter 30 and one end of another piezoelectric energy converter 33 by means of the aforementioned fused silver cementing compound. In like manner, still another piezoelectric energy converter 34 is attached to the other end of energy converter 33 with another metal screen electrode 35 of silver, copper, or nickel cemented therebetween by fused silver compound. At the other extremity of converter 34 is an alumina ($Al_2O_3$) disc 36, which is attached thereto by means of similar fused silver compound in such manner that said fused silver compound acts as an electrode 37. To the other end of alumina disc 36 is attached a lead mass load 38 as by an epoxy cement or the like.

Although only three piezoelectric energy converters are employed in the aforedescribed transducing element 26, any number of appropriately polarized piezoelectric converter elements which act as acoustic resonators may be used and combined with appropriate number of electrodes, etc. Furthermore, although all of the foregoing piezoelectric converters are preferably of the ceramic electroacoustic resonator type, any appropriate piezoelectric or other materials which convert electrical energy to proportional mechanical or acoustical energy, and vice versa, such as, for example, polarized barium titanate, Rochelle salt, quartz crystal, any of the lead zirconates and the like, may be substituted therefor.

Head 27 is herein depicted as having a substantially cylindrical section 39 as the rearward portion, a flared section 40 of appropriate increasing diameter in the intermediate portion, and a large section 41 with a substantially square acoustical energy projection face 42 at the forward end thereof. However, although so disclosed, it should be understood that any preferred geometrical configurations of said head and projection face are also contemplated to be within the scope of this A collar 43 of any material having a suitable bulk modulus and the necessary bonding characteristics such as Coroprene or rubber, for example, is interposed between flare 40 of head 27 and wedge portion 24 of cylinder 21 to act as a mechanical-acoustical-isolation mounting means as well as a secondary water-tight seal. In addition, another pair of resilient collars 44 and 45 of rubber or the like are interposed between one of the piezoelectric energy converter elements 33 and lead mass load 38 as a resilient support means for transducing member 26. Of course, said collars could be metal or any other suitable material as long as they were so designed to give negligible restrictive effects along the longitudinal axis of the transducing member and good mechanical dampening effects in all radial directions therefrom substantially normal to said longitudinal axis. In any event, collar 44 should preferably be located at the incipient nodal plane NP of the transducing element or that location having a minimum displacement and velocity during optimum load conditions, so as to minimize the mechanical and thermal shock that may be applied thereto as a result of the presence of otherwise uncontrollable vibration and rapid temperature changes, respectively. Collar 45 may be located at the position of optimum support of the transducing element, taking into consideration the length thereof, the positions of the other collars, and the respective weights of the individual masses of the combined elements thereof, including the fact that load 38 is of a heavy material such as lead and has considerably more inertia than its coacting elements, including head 27.

The forward portion 41 of head 27 is potted in any appropriate potting material 46 of the substantially acoustically clear variety, such as silicone rubber or polyurethane, which provides low transmission loss therethrough and which will also provide a water-tight seal thereat, as well as protection of the radiating face from any corresive effects of the environmental medium such as, for instance, sea water, fresh water, or the like.

Insulated electrical leads 47 and 48 are preferably connected to each of the aformentioned electrodes in such manner as to connect their associated piezoelectric energy converters in parallel. Such leads extend as necessary through holes in the aforesaid collars and through a water-tight packing gland 49 preferably located in a suitable aperture disposed in end plate 18. Of course, said piezoelectric energy converters may be electrically connected in series if so desired without violating the spirit and scope of this invention, since so doing would obviously be well within the purview of the skilled artisan.

FIG. 3 illustrates a portion of another embodiment of the transducer of this invention that is otherwise similar to that of FIG. 1 but distinguishes therefrom by having a unique support collar 50 of steel, stainless steel or the like mounted between the housing 15 and transducing element 26 at the nodal plane NP thereof. Said support collar comprises a ring portion 51 and a flanged portion 52 with an alumina nodal disc 53 concentrically inserted with snug fit within ring portion 51 in abutment with flange portion 52. A metallic nodal washer 54 of copper, brass, silver or nickel, having an outside diameter substantially equal to the inside diameter of housing 15 and an inside diameter smaller than the outside diameter of nodal washer 54 holds alumina disc 53 in place. A metallic sleeve 55 may be inserted within housing 15 and it preferably should have an outside diameter that is complementary with the inside diameter thereof and of sufficient length to extend to the inner face of end plate 18 and, thus, hold collar 50, disc 53, and washer 54 in place at the nodal plane region, as shown. If so desired, said support collar, disc, washer, as well as sleeve 55, which may be made of any suitable material such as brass, may be respectively connected and held in place within said housing by an epoxy cement or the like.

Briefly, the operation of the subject invention is as follows:

During the construction of transducers incorporating piezoelectric resonators, it is often necessary to bond two dissimilar materials for the purpose of obtaining mechanical strength, alignment and mounting, impedance matching, etc. In event one of said two dissimilar materials is a piezoelectric ceramic which is exposed to rapidly varying operational temperatures along with the other material, the dissimilar properties of the two materials such as coefficient of thermal expansion, coefficient of thermal conduction, and specific heat must be taken into consideration in order to prevent thermal destruction of the device. Otherwise, the combination may cause induced static and dynamic stresses to occur that either exceeds or lowers the threshold of the piezoelectric material thereto, thereby rendering it effectively inoperative. The actual result may be an immediate ceramic fracture or a subsequent fracture upon application of other ambient environmental forces such as mechanical or electrical driving forces, mechanical vibration, or the like.

It has been found that these undesirable results can be substantially eliminated by the insertion of a plate or disc of any appropriate material having an acoustical thickness that is small compared to the acoustic wavelength employed during operation and a coefficient of thermal expansion, coefficient of heat conduction, and capacitance that will protect the weakest material against said induced stresses and strains. Since the piezoelectric material is ordinarily weaker than the disc material, it provides the limiting factors. Accordingly, a disc material should be used, in such instance, which has thermal coefficients that are substantially similar to those of the piezoelectric material but have a larger stress and strain limit. Moreover, for obtaining the proper acoustic effects, the disc's density and sound velocity characteristics should fall within the range of the material densities and sound velocities of the piezoelectric material. For example, when bonding aluminum or lead to barium titanate or one of the lead zirconates, a high-density aluminum oxide wafer or disc, known as alumina in the trade, is interposed between and bonded to the metal and piezoelectric ceramic. This alumina disc has a density and sound velocity similar to aluminum and a thermal coefficient similar to barium titanate or the zirconates but a stress-strain limit that exceeds that of the piezoelectric ceramic by a factor of four or five to one. Hence, when the subject transducer is exposed to thermal shock as a result of being in contact with an ambient environmental medium where the temperature variations are rapid and quite extreme, the physical expansion or contraction, as the case may be, of the abutting dissimilar materials is sufficiently similar that the stronger of the two or the one having the highest heat coefficient will not change form more rapidly than the other and cause it to be fractured. In other words, both dissimlar materials change form or size in substantially the same manner and, thus, one does not unduly stress the other to the breaking point, even though other adverse factors such as physical impact or mechanical vibration may also be present during normal operation.

The devices of FIGS. 2 and 3 function in substantially similar manner. Only the structural elements are somewhat different in that an alumina nodal disc is placed between the ends of a pair of piezoelectric energy converters at the nodal plane of the entire transducing element in conjunction with a metallic support collar in FIG. 3, rather than having a resilient collar supporting the transducing element at the nodal plane thereof.

When electrical leads 47 and 48 are energized electrically by any appropriate sonar set or other electrical generator, the piezoelectric energy converters are actuated to produce acoustical energy that is proportional thereto. Because potting material 46 is so selected as to be acoustically clear, said acoustical energy is broadcast therethrough and into the communication medium. Since head 27 and load 38 both have predetermined stiffnesses and masses, the total structure of resonator 26 is detuned sufficiently to effect a fairly broad mechanical Q; hence, the frequency response thereof is substantially flat over a relatively broad band and the acoustical energy broadcast thereby may likewise be within a broad frequency range.

Although primarily intended as a transmitting device, transducer 12 may also be used as a receiving element which converts received acoustical energy into proportional electrical energy.

Moreover, when the subject transducers are disposed in an array, as examplarily illustrated in FIG. 1, all of the energy projecting faces thereof act in concert to provide an efficient broadcast of acoustical energy within a predetermined broad frequency range.

Obviously, many modifications and variations of the present invention are possible in the light of the above teachings. It is, therefore, to be understood, that within the scope of the appended claims, the invention may be practiced otherwise than as specifically described.

What is claimed is:

1. A transducer comprising in combination, a first metal body having a predetermined mass for projecting acoustical energy, a piezoelectric energy converter body with spaced parallel faces disposed in alignment with said acoustical energy projecting body, a first wafer means having thermal coefficients substantially similar to the thermal coefficients of said piezoelectric energy converter body and having stress-strain limits larger than the stress-strain limits of said piezoelectric energy converter body interposed in abutment with and bonded to opposed faces of said acoustical energy projecting body and said piezoelectric energy converter body, mass load body, a second wafer body having thermal coefficients substantially similar to the thermal coefficients of said piezoelectric energy converter body and stress-strain limits larger than the stress-strain limits of said piezoelectric energy converter body interposed between in abutment with and bonded to opposed faces of said piezoelectric energy converter body and the aforesaid mass load body, the bonding material on said parallel faces being of highly conducting fused metals, and means connected to said bonding materials for electrically energizing said converter body.

2. A transducer comprising in combination, a first vibratory body having a predetermined mass for projecting acoustical energy, piezoelectric energy converter means disposed in alignment with said acoustical energy projecting, a wafer having thermal coefficients substantially similar to the thermal coefficients of said piezoelectric energy converter means and stress-strain limits larger than the stress-strain limits of said piezoelectric energy converter means interposed between and in abutment with and bonded to said acoustical energy projecting body and said piezoelectric energy converter body, and thin metallic sheets connected to said piezoelectric energy converter means for electrically energizing same.

3. A transducer comprising in combination, a vibratory body having a relatively light mass for projecting acoustical energy, piezoelectric energy converter means disposed in alignment with said acoustical energy projecting body, load means having a mass that is greater than the mass of said acoustical energy projecting means, a first and a second wafer means having thermal coefficients substantially similar to the thermal coefficients of said piezoelectric energy converter means and stress-strain limits larger than the stress-strain limits of said piezoelectric energy converter means interposed between and in abutment with and bonded to said piezoelectric energy converter means and, respectively, the aforesaid load means and said vibratory body, the bonding material being a good electrical conductor, means for housing all of the aforesaid means in physical and electrical isolation with a predetermined ambient environmental medium, means respectively connecting said housing means and said acoustical energy projecting means, said housing means and said piezoelectric energy converter means, and said housing means and the aforesaid load means for spatially disposing same in predetermined relative positions forming a given geometrical configuration, and means connected to said piezoelectric energy converter means for electrically energizing same.

4. The invention according to claim 3 wherein said first wafer means is of aluminum oxide.

5. The invention according to claim 3 wherein said second wafer means is of aluminum oxide.

References Cited by the Examiner

UNITED STATES PATENTS

| | | | |
|---|---|---|---|
| 2,787,777 | 4/1957 | Camp | 340—10 |
| 2,913,602 | 11/1959 | Joy. | |
| 3,054,982 | 9/1962 | Kieser | 340—10 |
| 3,068,446 | 12/1962 | Ehrlich | 340—8 |

CHESTER L. JUSTUS, *Primary Examiner.*

J. P. MORRIS, J. W. MILLS, *Assistant Examiners.*